US010584769B2

(12) United States Patent
Peterson et al.

(10) Patent No.: US 10,584,769 B2
(45) Date of Patent: *Mar. 10, 2020

(54) HEAVY DUTY TRANSMISSION ARCHITECTURE

(71) Applicant: Eaton Cummins Automated Transmission Technologies LLC, Indianapolis, IN (US)

(72) Inventors: Paul R. Peterson, Scotts, MI (US); Joseph D. Reynolds, Climax, MI (US)

(73) Assignee: Eaton Cummins Automated Transmission Technologies, LLC, Galesburg, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/973,878

(22) Filed: May 8, 2018

(65) Prior Publication Data

US 2018/0259039 A1 Sep. 13, 2018

Related U.S. Application Data

(63) Continuation of application No. 14/662,830, filed on Mar. 19, 2015, now Pat. No. 9,989,123.
(Continued)

(51) Int. Cl.
*F16H 3/00* (2006.01)
*F16H 57/00* (2012.01)
(Continued)

(52) U.S. Cl.
CPC .............. *F16H 3/006* (2013.01); *F16H 3/08* (2013.01); *F16H 37/043* (2013.01); *F16H 37/046* (2013.01); *F16H 57/0037* (2013.01);

*F16H 3/095* (2013.01); *F16H 3/097* (2013.01); *F16H 3/0915* (2013.01); *F16H 2003/008* (2013.01);
(Continued)

(58) Field of Classification Search
CPC .... F16H 3/006; F16H 57/0037; F16H 37/043; F16H 37/046; F16H 3/08; F16H 3/097; F16H 3/095; F16H 2003/123; F16H 2037/045; F16H 3/0915; F16H 2003/008; Y10T 74/19223; Y10T 29/49464
See application file for complete search history.

(56) References Cited

U.S. PATENT DOCUMENTS 4,936,156 A 6/1990 Peterson et al.
5,305,863 A 4/1994 Gooch et al.
(Continued)

FOREIGN PATENT DOCUMENTS

DE 102007040911 A1 3/2009

*Primary Examiner* — Victor L MacArthur
(74) *Attorney, Agent, or Firm* — Harness, Dickey & Pierce, P.L.C.

(57) ABSTRACT

A transmission includes a main shaft having two or more main shaft clutches that couple gears to at least one countershaft, and an automated manual transmission coupled to the main shaft via the at least one countershaft. The automated manual transmission includes a front input shaft coupled directly to a main clutch and having a first clutch coupleable to the at least one countershaft, and a rear input shaft coupled to the front input shaft and having a second clutch coupleable to the at least one countershaft. The automated manual transmission is operable to selectively engage the first clutch and the second clutch.

19 Claims, 5 Drawing Sheets

Related U.S. Application Data

(60) Provisional application No. 61/978,444, filed on Apr. 11, 2014, provisional application No. 61/969,644, filed on Mar. 24, 2014, provisional application No. 61/968,837, filed on Mar. 21, 2014.

(51) Int. Cl.
  *F16H 37/04* (2006.01)
  *F16H 3/08* (2006.01)
  *F16H 3/091* (2006.01)
  *F16H 3/095* (2006.01)
  *F16H 3/097* (2006.01)
  *F16H 3/12* (2006.01)

(52) U.S. Cl.
  CPC .. *F16H 2003/123* (2013.01); *F16H 2037/045* (2013.01); *Y10T 29/49464* (2015.01); *Y10T 74/19223* (2015.01)

(56) References Cited

U.S. PATENT DOCUMENTS

| | | |
|---|---|---|
| 6,015,444 A | 1/2000 | Craft et al. |
| 8,142,322 B2* | 3/2012 | Raszkowski .......... F16D 25/061 74/331 |
| 8,398,519 B2* | 3/2013 | Raszkowski .......... F16D 25/061 74/331 |
| 2009/0272212 A1* | 11/2009 | Raszkowski .......... F16D 25/061 74/331 |
| 2010/0190604 A1* | 7/2010 | Lawson, Jr. .......... B60W 10/02 477/70 |
| 2012/0180585 A1* | 7/2012 | Raszkowski .......... F16D 25/061 74/329 |
| 2014/0026988 A1 | 1/2014 | Peterson et al. |
| 2015/0068336 A1 | 3/2015 | Peterson et al. |
| 2015/0267778 A1* | 9/2015 | Peterson ................ F16H 3/006 74/329 |

* cited by examiner

| Gear # | Ratio | |
|---|---|---|
| 18 | 0.834 | 19.9% |
| 17 | 1.000 | 20.0% |
| 16 | 1.200 | 18.5% |
| 15 | 1.422 | 19.9% |
| 14 | 1.705 | 20.0% |
| 13 | 2.046 | 18.8% |
| 12 | 2.431 | 19.9% |
| 11 | 2.914 | 20.0% |
| 10 | 3.498 | 18.1% |
| 9 | 4.131 | 19.9% |
| 8 | 4.952 | 20.0% |
| 7 | 5.945 | 18.5% |
| 6 | 7.042 | 19.9% |
| 5 | 8.442 | 20.0% |
| 4 | 10.133 | 18.8% |
| 3 | 12.038 | 19.9% |
| 2 | 14.431 | 20.0% |
| 1 | 17.322 | |
| OverAll | 20.765 | |

| Gear # | Ratio | |
|---|---|---|
| 18 | 0.692 | 20.5% |
| 17 | 0.834 | 19.9% |
| 16 | 1.000 | 18.0% |
| 15 | 1.180 | 20.5% |
| 14 | 1.422 | 19.9% |
| 13 | 1.705 | 18.3% |
| 12 | 2.017 | 20.5% |
| 11 | 2.431 | 19.9% |
| 10 | 2.914 | 17.6% |
| 9 | 3.428 | 20.5% |
| 8 | 4.131 | 19.9% |
| 7 | 4.952 | 18.0% |
| 6 | 5.843 | 20.5% |
| 5 | 7.042 | 19.9% |
| 4 | 8.442 | 18.3% |
| 3 | 9.989 | 20.5% |
| 2 | 12.038 | 19.9% |
| 1 | 14.431 | |
| OverAll | 20.848 | |

FIG. 4

HEAVY DUTY TRANSMISSION ARCHITECTURE

CROSS-REFERENCE TO RELATED APPLICATIONS

This application is a continuation application of U.S. non-provisional application Ser. No. 14/662,830 filed Mar. 19, 2015 (now U.S. Pat. No. 9,989,123), which claims priority to U.S. Provisional Application Ser. No. 61/968,837 filed Mar. 21, 2014, U.S. Provisional Application Ser. No. 61/969,644 filed Mar. 24, 2014, and U.S. Provisional Application Ser. No. 61/978,444 filed Apr. 11, 2014, the disclosures of which are incorporated by reference in their entirety.
r

TECHNICAL FIELD

The present disclosure relates to heavy duty transmission architecture for vehicles and more specifically to a transmission architecture that is configured to better facilitate automated shifting of a sliding clutch transmission, either as an automated manual transmission or a dual clutch transmission.

BACKGROUND

Manual transmissions are used for various vehicle applications. Such transmissions typically include a multiple speed main section containing a plurality of gears for various range and load gearing configurations. Traditionally, a clutch provides momentary torque interrupt when gear ratio changes occur. The clutch is used to engage the transmission from a driving shaft powered by an engine. Shifting with torque interrupt, however, is a manually demanding process that requires repeated engagement of the driver.

Systems have been developed to improve the shifting process, such as automated manual transmissions (AMTs) and dual clutch transmissions (DCTs). An AMT includes a clutch, a gearbox, and an embedded dedicated control system that uses electronic sensors, processors, and actuators to actuate gear shifts on the driver's throttle pedal command. An AMT removes the need for a clutch pedal while the driver is still able to control vehicle movement. The clutch itself is actuated by electronic equipment that can synchronize the timing and the torque required to make gear shifts quick and smooth.

Dual clutch transmissions (DCTs) have been developed that enable shifting between sets of gears without torque interrupt. In a dual clutch, the inner shaft and the outer shaft may have two or more connectable gears (via sliding clutches or sliding clutches and synchronizers) that drive their respective downstream layshaft members for appropriate speed ratios. The clutches can be alternately engaged as the gear progression is achieved between, for example, four sequential gears to permit power shifting between the progressive four ratios.

In some transmission designs, the number of gear shift options results in the operator having to shift up sequentially through all gear ratios before reaching full speed. Such transmission designs can include either an AMT or a DCT. It is desirable to increase the number of gear ratios in the transmission to facilitate skip shifting in lower gears while having an adequate range of operation of the gears at higher speeds for improved fuel efficiency. However, in some configurations the layout of the transmission can result in an increased length of the input shaft extension from its support bearing, which can compound eccentricity problems due to the increased length.

Therefore, it is desirable to provide a transmission having an increased number of gear ratios available to skip shift in lower speeds and have an adequate range of operation at higher speeds.

BRIEF DESCRIPTION OF THE DRAWINGS

Referring now to the drawings, illustrative examples are shown in detail. Although the drawings represent the exemplary illustrations described herein, the drawings are not necessarily to scale and certain features may be exaggerated to better illustrate and explain an innovative aspect of an exemplary illustration. Further, the exemplary illustrations described herein are not intended to be exhaustive or otherwise limiting or restricting to the precise form and configuration shown in the drawings and disclosed in the following detailed description. Exemplary illustrations of the present invention are described in detail by referring to the drawings as follows:

FIG. 4 illustrates exemplary gear ratios for a 3×3×2 configuration in single and double overdrive arrangements.

DETAILED DESCRIPTION

Figure 1:
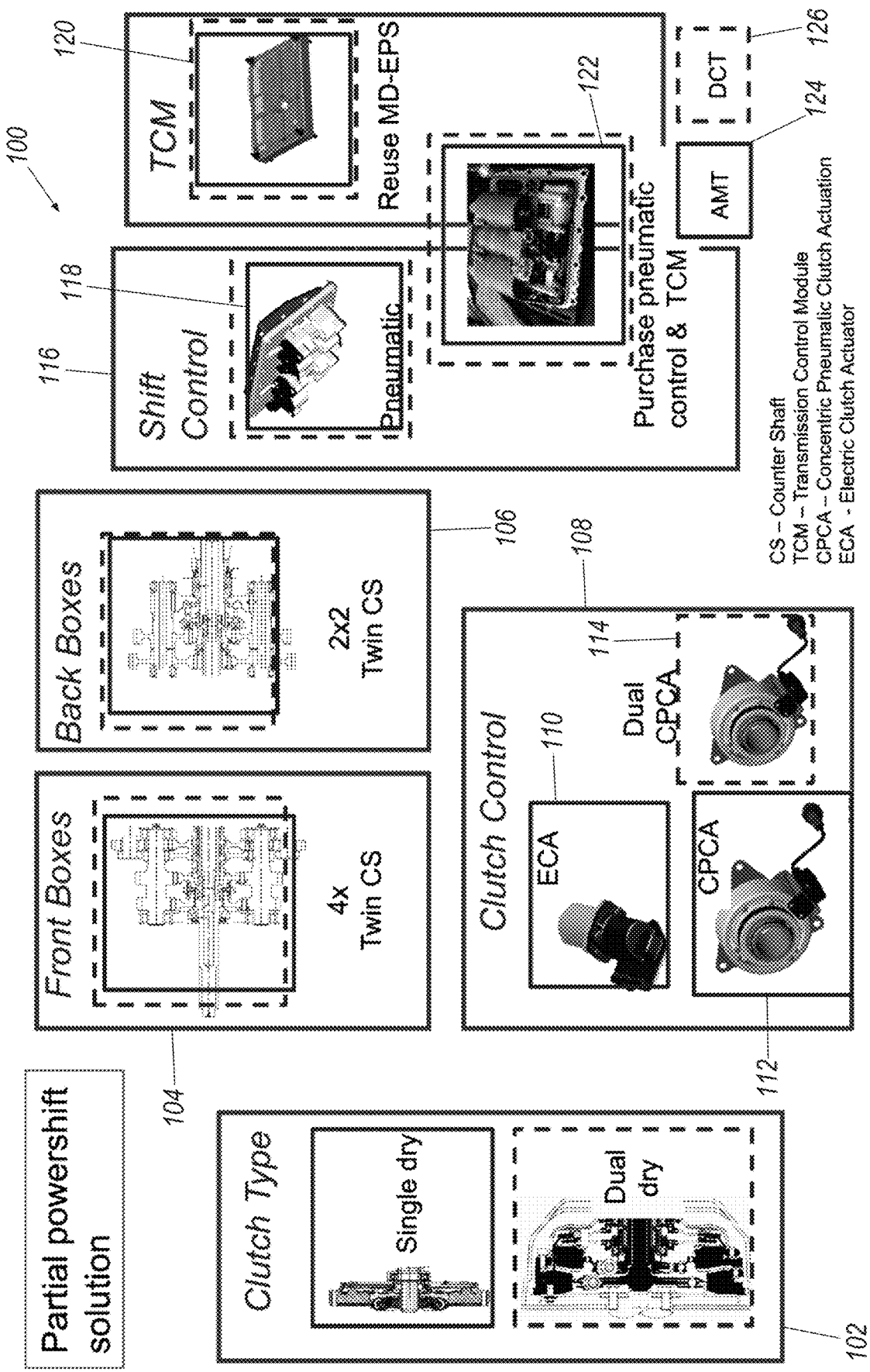
FIG. 1 is schematic block diagram of an exemplary transmission architecture configured to provide a plurality of gear ratio changes with reduced torque interrupt.

FIG. 1 is schematic block diagram 100 of an exemplary transmission architecture configured to provide a plurality of gear ratio changes with reduced torque interrupt. Various gearboxes can be implemented that result in a different number of gear combinations. Also, a clutch 102 is provided that allows powershifting (i.e., no torque interruption) between gears over at least portions of the total gearbox range of operation. Block diagram 100 shows front boxes 104 and back boxes 106 that, in combination, result in a total range of gear shifting of the 4×2×2 example. Block diagram 100 includes a clutch control 108 that includes an electric clutch actuator (ECA) 110, a concentric pneumatic clutch actuation (CPCA) 112, and an optional dual CPCA 114. Shift control 116 includes a pneumatic actuator 118 and a transmission control module 120, which in one example are combined into a single device 122. Block diagram 100 shows an automated manual transmission (AMT) 124, but includes a dual clutch transmission (DCT) 126 as an alternative example.

This exemplary transmission architecture can be further configured to have mechanisms and associated functions of an AMT, so as to provide model flexibility for application variances. AMT devices may be activated using electro-pneumatic, electro-hydraulic, and electro-mechanical devices. An AMT removes the need for a clutch pedal while the driver is still able to control vehicle movement.

In a typical AMT control scheme, a constant engine speed is requested during engagement so as to equalize engine and clutch torques as well as possible. Clutch control may provide a clutch torque reference, and through a suitable model, the torque reference is converted into a position reference for the clutch actuator position control. AMT designs provide model flexibility for application variances. AMT ratio change steps are designed to be somewhat small and fast, so as to be unnoticeable to the operator whose driving experience is similar to that associated with a power shifted device. The transmission can be further configured to provide even smaller steps when AMT ratio changes are encountered. These very small steps minimize perceived delay or AMT engine droop. The transmission can also be configured to use small actuation energy/time to accomplish the AMT ratio changes and improve the operating efficiency in high range (driving speeds) ratios.

Exemplary transmissions can have a direct drive configuration, overdrive configuration, or double overdrive configuration. These transmissions can have a gearbox including a 4×2×2 configuration (16 gear combinations), a 3×3×2 configuration (18 gear combinations), a 5×2×2 (20 gear combinations) configuration or other suitable configurations as desired. Exemplary single and double overdrive designs are disclosed. Overdrive is commonly known as a gear or gear combination in a motor vehicle that provides a gear ratio that is higher than that of a drive or input shaft, so that engine speed and fuel consumption are reduced. Thus, a single overdrive transmission design includes one gear combination that is higher than that of the input shaft, and a dual overdrive transmission includes two gear combinations that are higher than that of the input shaft.

An advantage of the exemplary transmission architecture is a robust design for application variances. In particular, the exemplary transmission can have a housing configured to contain therein any single member of a family of transmissions. Two examples can include the DCT and the AMT. However, the housing can be configured to enclose other suitable transmissions.

Figure 2:
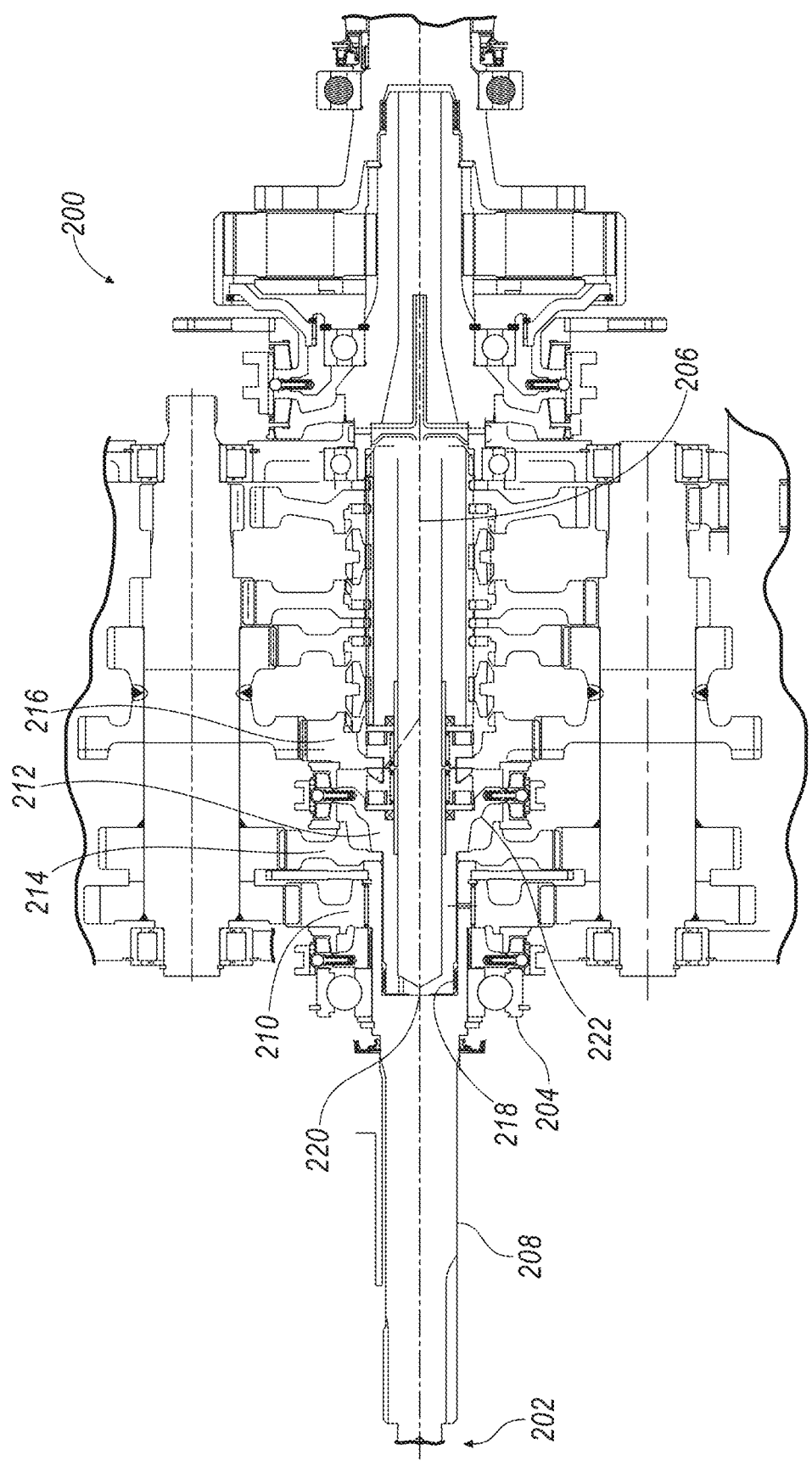
FIG. 2 illustrates a 3×3×2 configuration according to one exemplary embodiment.

FIG. 2 illustrates a 3×3×2 configuration 200 that is attractive due to its 18 ratios with smaller ratio step size and larger overall ratio coverage compared to a 12 speed 2×3×2 base. Typically, a 12 speed 2×3×2 design includes a two splitter input shaft section. The illustrated 3×3×2 configuration 200, on the other hand, includes a three splitter input shaft section. One challenge with a three splitter input shaft driven gears is the additional radial displacement of the longer input shaft with respect to the gearbox centerline. The radial displacement is inherent due to clutch housing, engine flywheel housing, engine block, journal bearing clearance and crankshaft eccentric tolerances. These tolerances accumulate to misalign a front pilot journal located at position 202 of the input shaft (at the engine crankshaft) with respect to a transmission input shaft bearing 204 (affixed to the clutch housing) and with respect to a gearbox centerline 206. This misalignment results in the input shaft rear portion (i.e., the portion residing within the gearbox) to be misaligned and radially displaced with respect to the gearbox centerline 206. The radial displacement grows linearly with respect to the axial distance from the transmission input shaft bearing 204. The means of coupling multiple drive gears to the input shaft and accommodating the radial displacement with respect to the centerline presents a challenge.

Therefore, the 3×3×2 configuration 200 includes a front input shaft 208 with coupling ability to a coaxial front drive gear 210 or a neutral state, and a rear input shaft 212 with coupling ability to either a coaxial $2^{nd}$ drive gear 214 or a coaxial $3^{rd}$ drive gear 216, or uncoupled in a neutral state. Front input shaft 208 is affixed in torsion to rear input shaft 212 via a spline joint 218. The front input shaft 208 and rear input shaft 212 are coupled together and axially contact each other at a surface 220 to transmit thrust loading. All three drive gears 210, 214, 216 are free to rotate about their respective input shaft axis when not affixed to an input shaft. Via spline 218 teeth circumferential clearance between the front input shaft 208 and rear input shaft 214, a rear input shaft synchronizer clutch hub 222 is able to locate coaxial with either $2^{nd}$ drive gear 214 or $3^{rd}$ drive gear 216 with little or no radial displacement with respect to those drive gears. Spline 218 teeth are positioned within a bore of front input shaft 208.

Figure 3:
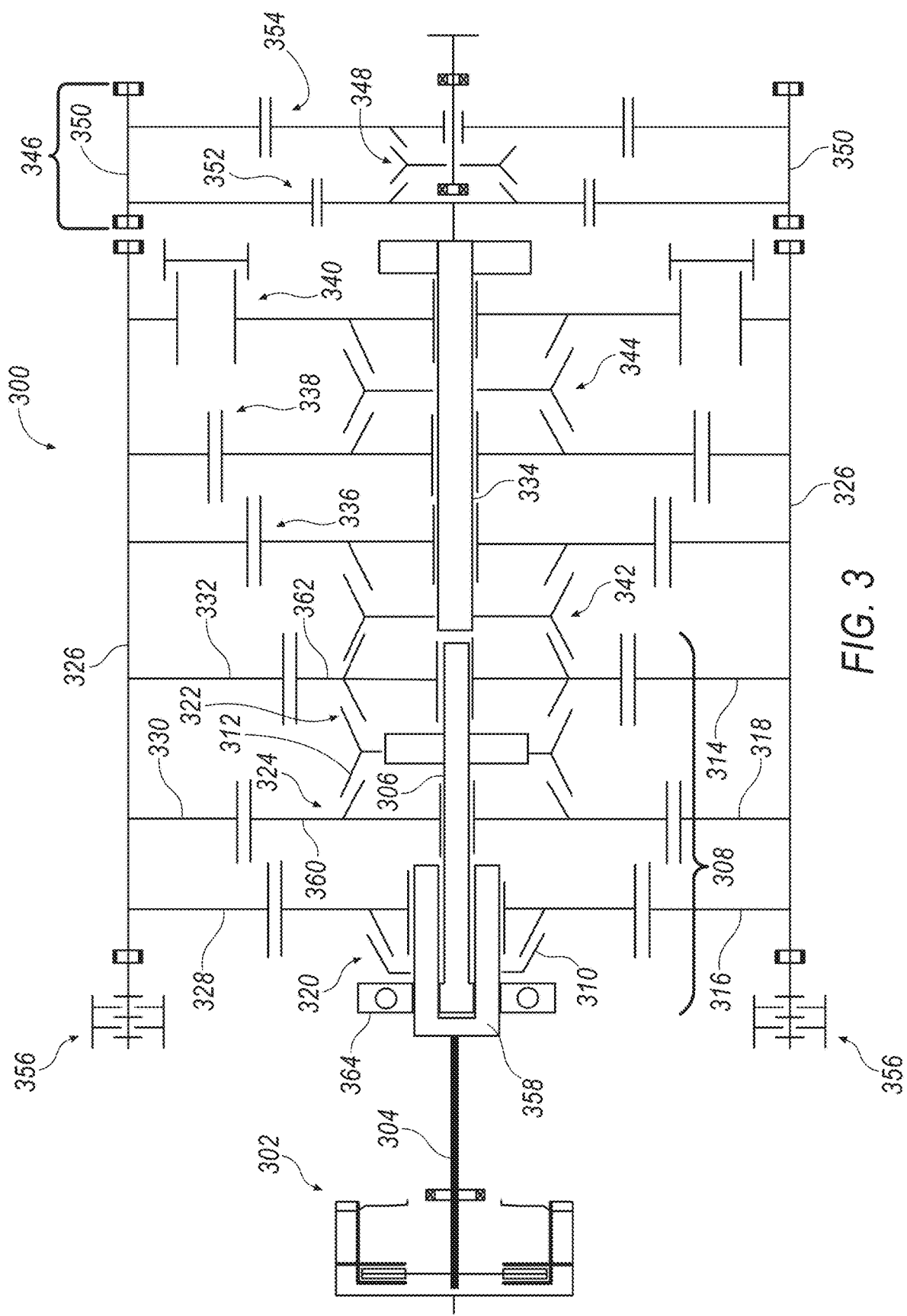
FIG. 3 is a schematic representation of an exemplary 3×3×2 configuration with AMT.

FIG. 3 is a schematic representation of a 3×3×2 transmission configuration 300 having a main clutch 302 for operating the three splitter input that comprises a front input shaft 304 and a rear input shaft 306. A splitter section 308 is operable via clutch 302, and splitter section 308 includes a forward clutch 310 and a rearward clutch 312. Forward and rearward clutches 310, 312 are coupled together and configured to selectively engage a gear 314, a gear 316, or a gear 318 via actuators. That is, forward clutch 310 engages gear 316 via a clutch mechanism 320, and rearward clutch 312 selectively engages either gear 314 or 318 via rearward or forward motion of rearward clutch 312, and its respective engagement with a clutch mechanism 322 or a clutch mechanism 324.

Configuration 300 includes countershafts 326 having respective gears 328, 330, 332 that enable coupling from both input shafts 304, 306, configuration 300 is thereby illustrated as a dual countershaft arrangement. However, although a dual countershaft is illustrated, it is contemplated that configuration 300 may include only one countershaft 326. Clutches 310, 312 are operable to engage, or not, by their respective clutch mechanisms 320, 322, 324. As an example, when clutch mechanism 320 is engaged, then clutch 312 is in a neutral position, and inputs shafts 304/306 cause rotation of countershaft 326 via gear 316 and gear 328. As another example, when gear mechanism 324 is engaged, then clutch mechanism 320 is disengaged and clutch 310 rotates freely with respect to gear 316. Input is thereby via gear 318 and gear 330 to countershaft 326.

Configuration 300 includes a main shaft 334 that is coupled to countershafts 326 via pairs of gears 332, 336, 338, 340, and is operable as an AMT. Main shaft 334 includes a forward clutch 342 and a rearward clutch 344 which, through selective forward or rearward motion, engage countershaft 326 with the main shaft 334. Selective engagement of the main shaft clutches 342, 344 enables implementation of various gear ratio combinations, with gear 340 providing a reverse capability. Thus, depending on which gear in splitter section 308 is engaged, and which gear along main shaft 334 is engaged, various gear ratios may be implemented. In addition, configuration 300 includes a two speed range gearbox section 346 that is itself operable via a range clutch 348. Two speed range gearbox section 346 includes its own range countershafts 350 that are engageable via gears 352 or 354. Accordingly, configuration 300 may be selectively engaged via controlled activation of three gears in the splitter section 308, three gears along the main shaft 334, and two gears in the two speed range gearbox section 346—hence the "3×3×2" nomenclature for the disclosed configuration 300.

Thus, at location 358 and also as described with respect to FIG. 2, via spline teeth circumferential clearance between the front input shaft 304 and rear input shaft 306, a rear input shaft synchronizer clutch hub (not shown in FIG. 3) is able to locate coaxial with either drive gear 360, 362 without radial displacement with respect to those drive gears.

Accordingly, transmission 300 includes a main shaft 334 having two or more main shaft clutches 342, 344 that couple gears 332, 336, 338, 340 to at least one countershaft 326, splitter section 308 coupled to the main shaft 334 via the at least one countershaft 326. The splitter section includes a front input shaft 304 coupled directly to a main clutch 302 and having a first clutch 310 coupleable to at least one countershaft 326, and a rear input shaft 306 coupled to the front input shaft 304 and having a second clutch 312 coupleable to at least one countershaft 326. The splitter section 308 is operable to selectively engage the first clutch 310 and the second clutch 312, and includes front input bearing 364 affixed to the clutch housing.

FIG. 4 illustrates exemplary gear ratios 400 for a 3×3×2 configuration in a single overdrive arrangement 402 and a double overdrive arrangement 404. Given the 3×3×2 arrangement, each configuration 402, 404 is shiftable through 18 gears 406, 408. Combinations of 18 gear combinations are selectively achieved via clutches 310, 312 of splitter section 308, clutches 342 and 344 on main shaft 334, and range clutch 348. In one example, configuration 402 ranges from an overall gear ratio of 17.322 when in $1^{st}$ gear, to 0.834 in $18^{th}$ gear. $17^{th}$ gear has a ratio of 1.000 and is achieved when the gears are configured in a direct drive mode. That is, the output rotational speed of the transmission is the same as the engine speed. Having only one gear with a ratio below 1.000 ($18^{th}$ gear at 0.834), overdrive is achieved for fuel efficiency purposes, and configuration 402 is thereby a single overdrive arrangement.

Configuration 404, on the other hand, ranges from an overall gear ratio of 14.431 in $1^{st}$ gear and has a direct drive arrangement in $16^{th}$ gear. $17^{th}$ gear has a ratio of 0.834 and $18^{th}$ gear has a ratio of 0.692. Having two gears with a ratio below 1.00, double overdrive is achieved for fuel efficiency purposes, and configuration 402 is thereby a double overdrive arrangement.

Accordingly, configurations 402 and 404 are illustrated in blocks of three 410, corresponding to operation of the splitter section through it first, second, and third arrangements via respective clutch operation, which repeat as the other gears within the transmission are likewise shifted up or down through the entire set of 18 gears, and correspond to patterns that may be obtained in a DCT arrangement in which power shifting occurs in repeated patterns. That is, the AMT performs or has a "feel" that is familiar to drivers that are familiar with DCT operation when shifting up and down through the total set of gear combinations. Configurations 402, 404 illustrate exemplary percentages 412 that correspond to the ratio step that is obtained through subsequent gear shifts.

Other configurations or arrangements may be achieved in accordance with this disclosure. For instance, in the above disclosure clutches 342, 344, and range clutch 348 are illustrated as synchronized clutches. That is, engagement of clutches 342, 344, and 348 occurs by synchronization which occurs during shifting, in one example, in which differential speed between rotating components is reduced via a spline and relative speeds between shafts are thereby controlled. However, clutches 342, 344, and 348 may be non-synchronized as well, in which case an inertial brake (shown as element 356 in FIG. 3, and can be coupled to either countershaft and either in the front or the rear) may be employed to control relative speeds before gear engagement. Additionally, FIG. 3 illustrates two speed twin countershaft range gearbox section 346 operable via range clutch 348, however it is contemplated that a planetary gear may likewise be employed and engaged via a clutch, as is known in the industry, as illustrated in FIG. 2.

Figure 5:
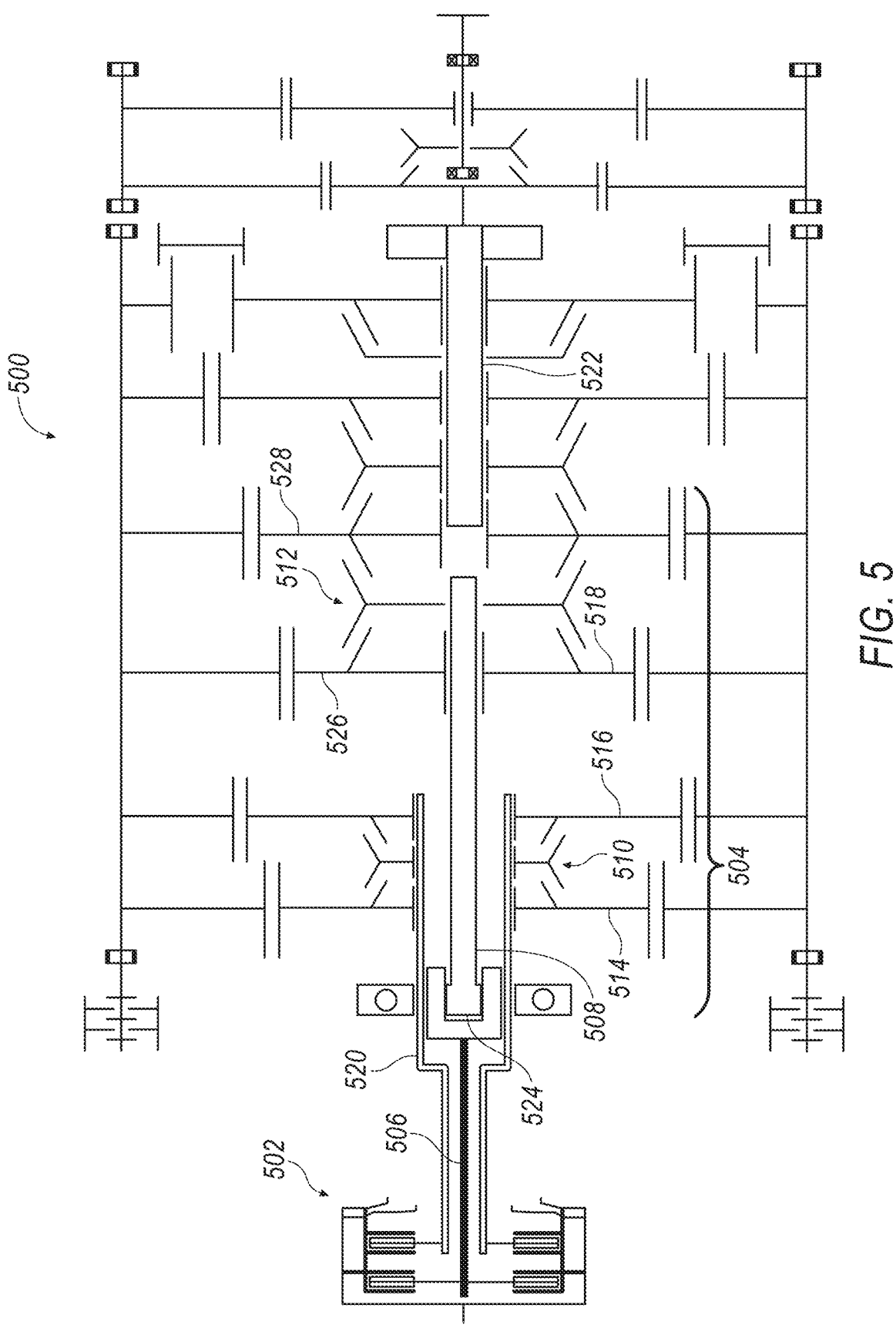
FIG. 5 illustrates a schematic of an exemplary 4×2×2 configuration with DCT.

FIG. 5 illustrates configuration 500 according to another exemplary embodiment that includes a dual clutch arrangement in lieu of the AMT operation described above. Configuration 500 generally includes a similar operation as the 3×3×2 arrangement disclosed above, but due to the presences of the dual clutch, configuration 500 and two clutches in the transmission section, is instead configured as a 4×2×2 arrangement.

Configuration 500 illustrates a main or dual clutch 502 for operating a splitter input 504 that comprises a front inner input shaft 506 and a rear inner input shaft 508. Splitter section 504 is operable via clutch 502, and splitter section 504 includes a forward clutch 510 and a rearward clutch 512. Forward and rearward clutches 510, 512 are configured to selectively engage gears 514, 516, 518, and 528 in a DCT operation.

Configuration 500 includes countershafts having respective gears that enable coupling from inner shafts 506, 508, and from an outer input shaft 520. Configuration 500 is illustrated as a dual countershaft arrangement, but may include only one countershaft. Clutches 510, 512 are operable to engage, or not, by respective clutch mechanisms. As an example, when forward clutch 510 is engaged (either fore or aft), then rearward clutch 512 may be in a neutral position, or selectively engage gears 518, 528 and outer input shaft 520 causes rotation of the countershaft via either respective gear. As another example, when rearward clutch 512 is engaged (either fore or aft), then forward clutch 510 is disengaged or selectively engage gear 514, 516.

Configuration 500 includes a main shaft 522 that is coupled to the countershafts via 2 pairs of forward gears and a reverse gear. Main shaft 522 includes a forward and rearward clutches which, through selective forward or rearward motion, engage the countershaft with the main shaft 522. Selective engagement of the main shaft clutches enables implementation of various gear ratio combinations, with an additional gear providing a reverse capability. Thus, depending on selective gear engagement, various gear ratios may be implemented. In addition, configuration 500 includes a two speed range gearbox section that is itself operable via a range clutch. The two speed range gearbox section includes its own range countershafts that are engageable via gears respective gears therein. Accordingly, configuration 500 may be selectively engaged via controlled activation of four gears in the splitter section 504, 2 gears along the main shaft 522, and two gears in the two speed range gearbox section—hence the "4×2×2" nomenclature for the disclosed configuration 500.

At a location 524 and also as described above with respect to the other exemplary embodiments, via spline teeth circumferential clearance between the front inner input shaft 506 and rear inner input shaft 508, a rear input shaft synchronizer clutch hub (not shown in FIG. 5) is able to locate coaxial with either drive gear 526, 528 without radial displacement with respect to those drive gears.

Accordingly, configuration 500 includes inner input shafts 506/508 having a splitter input 504 with two clutches that couple gears to at least one countershaft, and outer input shaft that couples gears to at least one countershaft. The gear configurations may be arranged as single overdrive arrangements, or dual overdrive arrangements, as well, through appropriate operation of the splitter 504

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the invention is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

Reference in the specification to "one example," "an example," "one approach," or "an application" means that a particular feature, structure, or characteristic described in connection with the example is included in at least one example. The phrase "in one example" in various places in the specification does not necessarily refer to the same example each time it appears.

What is claimed is:

1. A method of manufacturing a transmission, comprising:
   providing a main shaft having two main shaft clutches including a first main shaft clutch and a second main shaft clutch, the first main shaft clutch engageable with a first pair of gears with one in a fore direction and the other in an aft direction, and the second main shaft clutch engageable with a second pair of gears with one in the fore direction and the other in the aft direction; and
   providing an automated manual transmission using steps that include:
   a. coupling a front input shaft directly to a main clutch, the front input shaft having a first clutch coupleable to the two countershafts via a first splitter section gear; and
   b. coupling a rear input shaft directly to the front input shaft, the rear input shaft having a second clutch coupleable to the two countershafts via a second splitter section gear and a third splitter section gear;
   wherein the automated manual transmission splitter section is operable to selectively engage the first clutch and the second clutch; and
   wherein the gear of the first pair of gears that is in the fore direction is on the rear input shaft, and the gear of the first pair of gears that is in the aft direction is on the main shaft.

2. The method of claim 1, further comprising positioning a spline joint between the front input shaft and the rear input shaft, the spline joint having teeth that coaxially locate a drive gear of the second input shaft without radial displacement via a rear input shaft synchronizer clutch hub.

3. The method of claim 2, further comprising positioning the spline joint within a bore of the first input shaft.

4. The method of claim 1, wherein the method of manufacturing the transmission further comprises:
   providing the first clutch to be coupleable to the two countershafts via one clutch mechanism;
   providing the second clutch to be coupleable to the two countershafts via two clutch mechanisms; and
   providing the one clutch mechanism and the two clutch mechanisms to be selectively engageable via operation of the automated manual transmission splitter section using the main clutch.

5. The method of claim 4, further comprising coupling a two speed range gearbox section to the main shaft, the two speed range gearbox section operable via a range clutch.

6. The method of claim 5, wherein gear selection defined by the first clutch, the second clutch, the two main shaft clutches, and the range clutch include 18 selectable gear ratios.

7. The method of claim 6, wherein the 18 selectable gear ratios include at least one overdrive gear ratio in which a total ratio of the gears is less than 1.000.

8. The method of claim 6, wherein at least one of the two main shaft clutches and the range clutch is a synchronized clutch.

9. The method of claim 6, wherein at least one of the two main shaft clutches and the range clutch is a non-synchronized clutch.

10. The method of claim 9, further comprising coupling an inertial brake to the two countershafts.

11. The method of claim 1, wherein the two main shaft clutches couple at least three gears to the two countershafts.

12. The method of claim 1, wherein the step of coupling the rear input shaft directly to the front input shaft further comprises coupling the rear input shaft to transmit a thrust loading.

13. A transmission, comprising:
   a main shaft having two main shaft clutches including a first main shaft clutch and a second main shaft clutch, the first main shaft clutch engageable with a first pair of gears with one in a fore direction and the other in an aft direction, and the second main shaft clutch engageable with a second pair of gears with one in the fore direction and the other in the aft direction; and
   an automated manual transmission splitter section coupled to the main shaft via the two countershafts, the automated manual transmission splitter section comprising:
   a front input shaft coupled directly to a main clutch and having a first clutch coupleable to the two countershafts via a first splitter section gear; and
   a rear input shaft coupled to the front input shaft to transmit a thrust loading, the rear input shaft having a second clutch coupleable to the two countershafts via a second splitter section gear and a third splitter section gear;
   wherein the automated manual transmission splitter section is operable to selectively engage the first clutch and the second clutch; and
   wherein the gear of the first pair of gears that is in the fore direction is on the rear input shaft, and the gear of the first pair of gears that is in the aft direction is on the main shaft.

14. The transmission of claim 13, wherein the front input shaft and the rear input shaft are coupled via a spline joint positioned between the front input shaft and the rear input shaft, the spline joint having teeth that coaxially locate a drive gear without radial displacement via a rear input shaft synchronizer clutch hub.

15. The transmission of claim 14, wherein the spline joint is located within a bore of the first input shaft.

16. The transmission of claim 13, the automated manual transmission further comprising:
   the first clutch coupleable to the two countershafts via one clutch mechanism; and
   the second clutch coupleable to the two countershafts via two clutch mechanisms;
   wherein the one clutch mechanism and the two clutch mechanisms are selectively engageable via operation of the automated manual transmission splitter section using the main clutch.

17. The transmission of claim 13, further comprising a two speed range gearbox section operable via a range clutch and coupled to the main shaft, and wherein gear selection defined by the first clutch, the second clutch, the two main shaft clutches, and the range clutch include 18 selectable gear ratios.

18. The transmission of claim 17, wherein:
   the 18 selectable gear ratios include at least one overdrive gear ratio in which a total ratio of the gears is less than 1.000; or
   at least one of the two main shaft clutches and the range clutch is a synchronized clutch; or
   at least one of the two main shaft clutches and the range clutch is a non-synchronized clutch.

19. The transmission of claim 18, further comprising an inertial brake coupled to the at least one countershaft.

* * * * *